G. K. GARVIN.
TURRET SUPPORT AND INDEXING MECHANISM.
APPLICATION FILED FEB. 18, 1914.
1,180,837.
Patented Apr. 25, 1916.
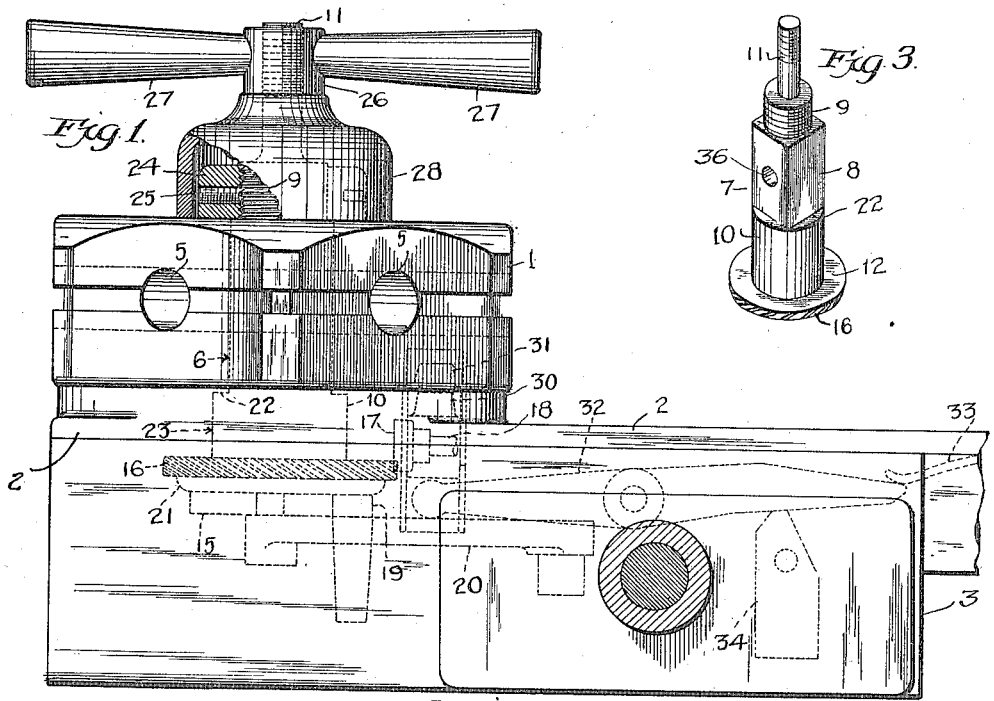

UNITED STATES PATENT OFFICE.

GEORGE K. GARVIN, OF NEW YORK, N. Y., ASSIGNOR TO GARVIN MACHINE COMPANY, A CORPORATION OF NEW YORK.

TURRET SUPPORT AND INDEXING MECHANISM.

1,180,837.

Specification of Letters Patent.

Patented Apr. 25, 1916.

Application filed February 18, 1914. Serial No. 819,567.

*To all whom it may concern:*

Be it known that I, GEORGE K. GARVIN, a citizen of the United States, and a resident of New York, in the county of New York and State of New York, have invented certain new and useful Turret Support and Indexing Mechanism, of which the following is a specification.

This invention relates to index mechanism for turrets and consists in features by which the turret motion is determined with precision, and also made enduring, so that it is not subject to failures either by reason of the shocks and pounding of use, or the frictional wear between any moving surfaces.

Above all the turret is fortified and guarded against any yielding resulting from the weakness or springing of parts or the looseness of joints and the like, which have been a cause of lack of strength and play in prior construction.

With these and other objects in view the invention consists in the improved turret as hereinafter set forth and shown.

In the drawings, Figure 1 is a side elevation of a turret embodying the principles of the present invention. Fig. 2 is a top plan view partly broken away. Fig. 3 is a detail perspective view of the turret rotator or shank.

Constructions embodying the invention will include a turret 1 of the usual hexagonal or other form supported on a turret slide 2, sliding in the turret base 3, which in turn is adapted to be clamped at any suitable position on the lathe bed, in the usual or any approved way. It will furthermore be understood that the usual turret holes 5 are also provided, in which tools are received.

Through the axis of the turret 1, according to the present invention, a comparatively large prismatic hole 6 is broached or formed, preferably square as shown in dotted lines in Fig. 2. In this hole a turret shank 7 is accurately fitted, the square hole and square portion 8 of the shank being as already pointed out, of quite substantial size. A form of shank for serving this purpose is illustrated in Fig. 3 where a reduced threaded section 9 is extended above the square portion 3, and an enlarged cylindrical body or portion 10 formed below the square portion 8. An extension 11 is carried upward at the extreme top for a purpose later described, and a disk or wheel 12, formed as hereinafter described, is integrally provided at the extreme bottom of this shank. The main features of this integral construction having now been mentioned, the detail features of each will be particularly pointed out.

It will be understood that an ordinary turret has what is known as an index star wheel 15, the same turning with the turret, and in the present construction a spiral gear 16 also rotates with the turret for the purpose of turning an engaging gear or pinion 17 rotating on a longitudinal axis 18 in the turret slide 2. This positions various stops, in a manner which is understood by those skilled in the art, fixing the forward movement of the turret for each particular tool acting. The backward movement of the turret is determining by a separate stop 19 which is fixed in the turret base 3, and which has the additional function of engaging the index star wheel 15 and limiting the rotative movement of the turret. The index star wheel 15 is further acted upon by a pivoted dog 20 which engages the teeth thereof, and which causes a partial rotation just as the turret is approaching its rearmost position.

By the present invention the teeth of the index star wheel 15 are shrouded by a flange 21, which in turn is integrally made a part of the spiral gear 16, the flange 21 being enough larger than the star wheel teeth to adequately shroud the same, while the spiral gear 16 is enough larger than the flange 21 to permit its teeth to be cut in the usual way.

It will be seen that the turret is accurately fitted upon the square portion 8 of the shank 7, which arrangement permits great exactness and permanence in the rotative or angular relations between the turret and its shank. This engagement however does not exactly fix the longitudinal relation of the turret and its shank, nor does the shoulder or face 22 fix this relation, a slight space being left between this shoulder and the bottom face of the turret. The round portion 10 of the shank does, however, fit and rotate accurately in a suitable hole 23 or bushing of the turret slide, and in this relation the upper face of the spiral gear 16 bears against a flat surface of the turret slide and constitutes a shoulder to take any upward thrust upon the shank or turret. The shank is adjusted and maintained to project just far enough below the turret to keep these faces in close, but not clamping engagement, this being accomplished by a nut or threaded collar 24 upon the threaded portion 9 of the shank 7. This nut or threaded collar is fixed in any suitable position by a set screw 25. It is evident, however, that since this engagement permits the turret to turn, that it is not such a perfectly tight engagement as may be desirable for accurate work in fixing the location of the turret. Accordingly a second nut 26 is mounted on the threaded extension 11 having conveniently projecting handles 27 for manipulation, and laterally extending cap 28 extending out over the top surface of the turret. This hand nut may be quickly clamped down upon the turret at any time, binding it upon the turret slide in any position. When, however, this hand nut is loosened the turret may rotate and may be further made subject to any amount of precision in its guiding movement, as determined by the adjustment of the nut or screw collar 24 which has its position normally fixed by the set screw 25.

It will be understood that one of the important features of the present invention consists in the coördination of the various features of the shank, namely, the index star wheel at the bottom shrouded by a somewhat enlarged and preferably rounded flange, in turn integrally joined to a spiral gear sufficiently larger to permit the teeth being cut, which in turn is an integral part of a circular shank which merges into a prismatic or prism like section of sufficient size to accurately determine the position of the turret thereon, while permitting slight longitudinal adjustment, this prismatic section being integrally surmounted by a threaded portion for a normally fixed nut or screw collar, the latter being surmounted by a final threaded stud for a hand nut, acting for the purpose described. These features provide for the indexing movement of the turret with permanent precision not liable to be impaired by wear or shocks, or the strains of use. There will be a vertically moving index pin 30, adapted to fit into a series of taper holes 31 in the bottom of the turret, which is projected into these holes at the completion of any indexing movement by a lever 32 and spring 33. The index pin 30 is however withdrawn from its locking position in suitable season to permit the rotative or indexing movement of the turret, by a tumbler 34 which is in the path of the lever 32 while the turret is making its return movement, but which rocks down out of the way and permits the index pin 30 to lock the turret, immediately that the turret commences its forward movement. It will be observed that the rearward movement of the turret takes place until one of the flat faces of the index star wheel strikes against the flat face of the fixed solid stop 19 projecting upward from the turret base. The fixed stop 19 takes all the shock of this return movement, and also stops the rotation of the turret which is being turned at this time under the influence of the pivoted dog 20, it being evident that the fixed solid stop 19 is directly in the path of a tooth of the index star wheel, which is immediately afterward engaged, limiting the rotative movement so that the vertically moving index pin 30 may set itself.

In order to permit the use of work which will extend clear through the turret, a diametrical hole 36 is carried through the square portion of the shank 7, which will evidently permit of work being carried through the turret from either side on this axis.

A size relation coördinating to the features and functions already described, will also be observed between the various parts of the shank. For example, while the prismatic section is comparatively large for the purposes already referred to, the round portion directly below is at least in effect larger still, its diameter being preferably as great as twice the greatest radius of the prismatic section or thereabout, to the end that this part may be assembled in the bearing of the turret slide notwithstanding the integral construction. Furthermore, the spiral gear below is larger still, thereby furnishing a thrust shoulder and also a sufficient size to completely shroud the index star wheel, and at the same time permit the teeth to be cut. This comparatively large size does not produce an unfavorable speed relation in driving the stop spindle gear 17 on account of the spiral teeth.

What is claimed is:—

In a turret indexing mechanism, a turret slide, a turret having a prismatic hole, a shank having a portion of prismatic section fitting said hole in the turret, and an enlarged cylindrical portion beneath said portion of prismatic section and fitting in said turret slide, and a flange larger than said cylindrical portion and below the same and a star wheel shrouded by said flange and below the same, said flange being formed to constitute a spiral gear whereby the usual turret stops are operated, said flange furthermore constituting a thrust against any upward movement of the turret in its slide, substantially as described.

Signed at New York city, in the county of New York, and State of New York, this 13th day of February, A. D. 1914.

GEO. K. GARVIN.

Witnesses:
CHAS. T. LUTHER,
R. FRANKEL.

Copies of this patent may be obtained for five cents each, by addressing the "Commissioner of Patents, Washington, D. C."